(12) United States Patent
Shin et al.

(10) Patent No.: US 12,192,341 B2
(45) Date of Patent: Jan. 7, 2025

(54) METHOD FOR PROTECTING DATA FOR INFORMATION CENTRIC IN-NETWORK COMPUTING AND SYSTEM USING THE SAME

(71) Applicant: ELECTRONICS AND TELECOMMUNICATIONS RESEARCH INSTITUTE, Daejeon (KR)

(72) Inventors: Ji Soo Shin, Daejeon (KR); Sae Hoon Kang, Daejeon (KR); Nam Seok Ko, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 198 days.

(21) Appl. No.: 17/884,748

(22) Filed: Aug. 10, 2022

(65) Prior Publication Data
US 2023/0155819 A1    May 18, 2023

(30) Foreign Application Priority Data
Nov. 15, 2021  (KR) .......................... 10-2021-0156480

(51) Int. Cl.
*H04L 9/08*  (2006.01)
*H04L 9/14*  (2006.01)
(Continued)

(52) U.S. Cl.
CPC ............ *H04L 9/085* (2013.01); *H04L 9/0861* (2013.01); *H04L 9/14* (2013.01); *H04L 9/3073* (2013.01);
(Continued)

(58) Field of Classification Search
CPC ... H04L 9/3247; H04L 9/3268; H04L 67/568; H04L 45/42
See application file for complete search history.

(56) References Cited

U.S. PATENT DOCUMENTS

| | | | |
|---|---|---|---|
| 10,805,071 B2 | 10/2020 | Wold et al. | |
| 2015/0222424 A1* | 8/2015 | Mosko ................. | H04L 9/3247 713/150 |

(Continued)

FOREIGN PATENT DOCUMENTS

| | | |
|---|---|---|
| JP | 2017-518010 A1 | 6/2017 |
| KR | 10-0834576 B1 | 6/2008 |

(Continued)

*Primary Examiner* — Barbara B Anyan
(74) *Attorney, Agent, or Firm* — LRK PATENT LAW FIRM

(57) ABSTRACT

Disclosed herein are a method for protecting data for information centric in-network computing and a system using the same. The method includes: preparing, at a computing node, a an encryption key pool that includes a security key for sharing a symmetric key used for encrypting result data according to a user's request and matching information; preparing, at an INC agent receiving the user's request, a synchronization key pool for sharing the security key through the matching information; and creating, by the computing node, a processor for executing output processing of the result data and allocating a security key to the processor based on the matching information of the encryption key pool when a security key exists. The security key is allocated to the computing node which is determined to perform the request in the INC agent.

18 Claims, 7 Drawing Sheets

(51) Int. Cl.
  *H04L 9/30* (2006.01)
  *H04L 9/32* (2006.01)
(52) U.S. Cl.
  CPC .......... *H04L 9/3247* (2013.01); *H04L 9/3268* (2013.01)

(56) References Cited

U.S. PATENT DOCUMENTS

| | | |
|---|---|---|
| 2016/0149871 A1 | 5/2016 | Heo et al. |
| 2017/0149932 A1 | 5/2017 | Rossi et al. |
| 2017/0201375 A1 | 7/2017 | Amin et al. |
| 2018/0278424 A1* | 9/2018 | Sardesai ............... H04L 67/568 |
| 2019/0098104 A1 | 3/2019 | Kim et al. |
| 2020/0175186 A1 | 6/2020 | Guabtni |
| 2020/0186463 A1* | 6/2020 | Kang ...................... H04L 45/42 |
| 2021/0167947 A1* | 6/2021 | Chung .................. H04L 9/3268 |

FOREIGN PATENT DOCUMENTS

| | | |
|---|---|---|
| KR | 10-2015-0093112 A | 8/2015 |
| KR | 10-2015-0141362 A | 12/2015 |
| KR | 10-2020-0069496 A | 6/2020 |
| KR | 10-2021-0066640 A | 6/2021 |

* cited by examiner

METHOD FOR PROTECTING DATA FOR INFORMATION CENTRIC IN-NETWORK COMPUTING AND SYSTEM USING THE SAME

CROSS-REFERENCE TO RELATED APPLICATION

The present application claims priority to a Korean application 10-2021-0156480, filed Nov. 15, 2021, the entire contents of which are incorporated herein for all purposes by this reference.

BACKGROUND OF THE INVENTION

1. Field of the Invention

The present disclosure relates to a method for protecting data for data name-based information centric in-network computing and a system using the method, and more particularly, to a method for protecting data for information centric in-network computing, which provides encryption for an operation result when an in-network computing service is provided in an information centric in-network environment, and to a system using the method.

2. Description of Related Art

Recently, a study is actively underway, mainly led by the coinrg of IETF, about providing an In-Network Computing (INC) service in an Information Centric Networking (ICN) environment which is being highlighted as a next-generation Internet technology. In the existing Internet, data delivery is performed through addresses of originators and receivers, while communication in ICN is performed based on names of data. Representative research projects of ICN are Content Centric Networking (CCN) and Named Data Networking (NDN).

The INC technology, also called in-network processing, is a concept of transferring a computing operation, which is performed in user equipment or a server, to network equipment. As the INC technology is capable of performing operations through dispersed placement in optimal network positions according to features of data and computing operations, a fast service is possible and the traffic overhead of a network may be reduced.

In such an environment, since data created by an INC service is delivered via a network, it is very important to protect data from various attacks through data encryption.

The symmetric encryption technology and the asymmetric encryption technology are conventional data encryption methods. A representative symmetric encryption technology is the Advanced Encryption Standard (AES), which is a public algorithm available to everyone and has excellent security using a key with a size of 128 to 256 bits. However, since the symmetric encryption technology uses a same encryption key, the key distribution problem should be solved to enable transmitting and receiving nodes of data to safely share the key. On the other hand, as the asymmetric encryption technology has an encryption key and a decryption key different from each other, one key (referred to as a secret key or a private key) may be protected, and the other key (referred to as a public key) may be opened. The asymmetric encryption technology solves the key distribution problem of the symmetric encryption technology but has a significantly long encryption/decryption time. Accordingly, a typical practice is to deliver a symmetric encryption key using an asymmetric encryption technology and to apply a symmetric encryption technology to encryption of data.

With this background, when in-network distributed computing is performed and an encryption service is provided for an operation result, the related art faces the following problems.

First, since an information centric network operates in a request-response manner without keeping a session between two nodes that perform communication, a procedure for key distribution is needed along with a request-response procedure for an in-network computing service. Accordingly, the related art needs a separate procedure like 3-way or 4-way handshake, and corresponding packet exchange is unavoidable.

Second, an INC service dynamically determine a location of performing computation. That is, since, at a user's request, an optional location is determined according to a location of data or a state of a network, a forwarding policy, and a distributed computing scheme, a device for performing an operation cannot be prepared in advance. Accordingly, a procedure for supporting encryption including key distribution should start after a device for performing an operation is determined.

Third, an INC service operates based on a container technology and is directed to a low latency service. As the operation of an INC service includes generating a container in a public network device, performing an operation at a user's request and then returning the container, a method is needed to minimize latency for encryption and respond as fast as possible to the user's request.

In this regard, the present disclosure defines a method of providing encryption with a minimal procedure and lowest latency, when providing an INC service, and a structure of an INC processing device.

SUMMARY

A technical object of the present disclosure is to provide a method for protecting data for information centric in-network computing, which provides encryption for an operation result when an In-Network Computing (INC) service is provided in an information centric in-network environment, and a system using the method.

Another technical object of the present disclosure is particularly to provide a structure of an INC device which supports encryption in a minimal procedure when providing an INC service, prepares a procedure for encryption before a user's request in an environment where an operation location is dynamically determined, and is implemented in an information centric network environment.

The technical objects of the present disclosure are not limited to the above-mentioned technical objects, and other technical objects that are not mentioned will be clearly understood by those skilled in the art through the following descriptions.

According to the present disclosure, there is provided a method for protecting data for data name-based information centric in-network computing, the method comprising: preparing, at a computing node, a an encryption key pool that includes a security key for sharing a symmetric key used for encrypting result data according to a user's request and matching information; preparing, at an INC agent receiving the user's request, a synchronization key pool for sharing the security key through the matching information; and creating, by the computing node, a processor for executing output processing of the result data and allocating a security key to the processor based on the matching information of the encryption key pool when a security key exists. The security key is allocated to the computing node which is determined to perform the request in the INC agent.

According to the embodiment of the present disclosure in the method, the security key may include a public key and the encryption key pool may include the public key, a secret key pairing up with the public key, and the matching information corresponding to the public key and the secret key.

According to the embodiment of the present disclosure in the method, the method may further comprise removing, by the INC agent and the computing node, the allocated security key and the matching information from the synchronization key pool and the encryption key pool when the security key is allocated to the processor and creating a new security key and new matching information.

According to the embodiment of the present disclosure in the method, after the creating of the processor and allocating of the security key, a device of the user may access the processor, and data exchange may be implemented between the device of the user and the processor.

According to the embodiment of the present disclosure in the method, the method may further comprise transmitting, by the processor, a name of the processor and the security key to the device of the user, creating, by the device, a symmetric key by using the security key and encrypting the symmetric key and transmitting the symmetric key to the processor, outputting, in the processor, the result data, encrypting the result data by the symmetric key and transmitting the encrypted result data to the device, and decoding, by the device, the encrypted result data by the symmetric key.

According to the embodiment of the present disclosure in the method, the method may further comprise checking, in the processor, a security key allocated to the processor based on the matching information of the encryption key pool after the encrypting and transmitting of the symmetric key to the processor and decoding the encrypted symmetric key by the security key.

According to the embodiment of the present disclosure in the method, the output processing of the result data may be operation processing based on a requested data-related command in the user's request.

According to the embodiment of the present disclosure in the method, the method may further comprise determining, by the INC agent, whether or not to process the received user's request, by considering resource information of the computing node managed by the INC agent together with data and a function for the operation processing, which are included in the requested data-related command, and performance policy information before the creating of the processor and allocating of the security key.

According to the embodiment of the present disclosure in the method, the method may further comprise creating, by the computing node, a processor for executing the output processing of the result data, when there is no security key allocated to the computing node which is determined to perform the request.

According to the embodiment of the present disclosure in the method, the method may further comprise outputting, in the processor, the result data and transmitting the result data to the device of the user, and receiving, in the device, the result data.

According to another embodiment of the present disclosure, there is provided a system for protecting data for data name-based information centric in-network computing, the system comprising: a computing node configured to prepare an encryption key pool that includes a security key for sharing a symmetric key used for encrypting result data according to a user's request and matching information; and an INC agent configured to receive the user's request and prepare a synchronization key pool for sharing the security key through the matching information. The computing node creates a processor for executing output processing of the result data and allocates a security key to the processor based on the matching information of the encryption key pool when the security key exists. The security key is allocated to the computing node which is determined to perform the request in the INC agent.

The features briefly summarized above for this disclosure are only exemplary aspects of the detailed description of the disclosure which follow, and are not intended to limit the scope of the disclosure.

According to the present disclosure, it is possible to provide a method for protecting data for information centric in-network computing, which encrypts an operation result, and a system using the method, when an operation is performed in a network at a user's request of INC service and the operation result is returned to the user.

According to the present disclosure, an asymmetric encryption key pair may be created in advance in a computing node to synchronize a public key, and a symmetric key for encryption of an operation result may be safely delivered to a device that performs an operation.

Specifically, encryption for an operation result may be supported, and latency needed for creating an asymmetric encryption key pair in a computing node may be removed. In addition, an encryption/decryption operation is performed in parallel with an INC procedure so that latency of encryption/decryption may be minimized. Unlike an INC procedure not supporting encryption, a further procedure is needed as least as possible.

Effects obtained in the present disclosure are not limited to the above-mentioned effects, and other effects not mentioned above may be clearly understood by those skilled in the art from the following description.

The technical problems solved by the present disclosure are not limited to the above technical problems and other technical problems which are not described herein will be clearly understood by a person (hereinafter referred to as an ordinary technician) having ordinary skill in the technical field, to which the present disclosure belongs, from the following description.

DETAILED DESCRIPTION

Figure 1:
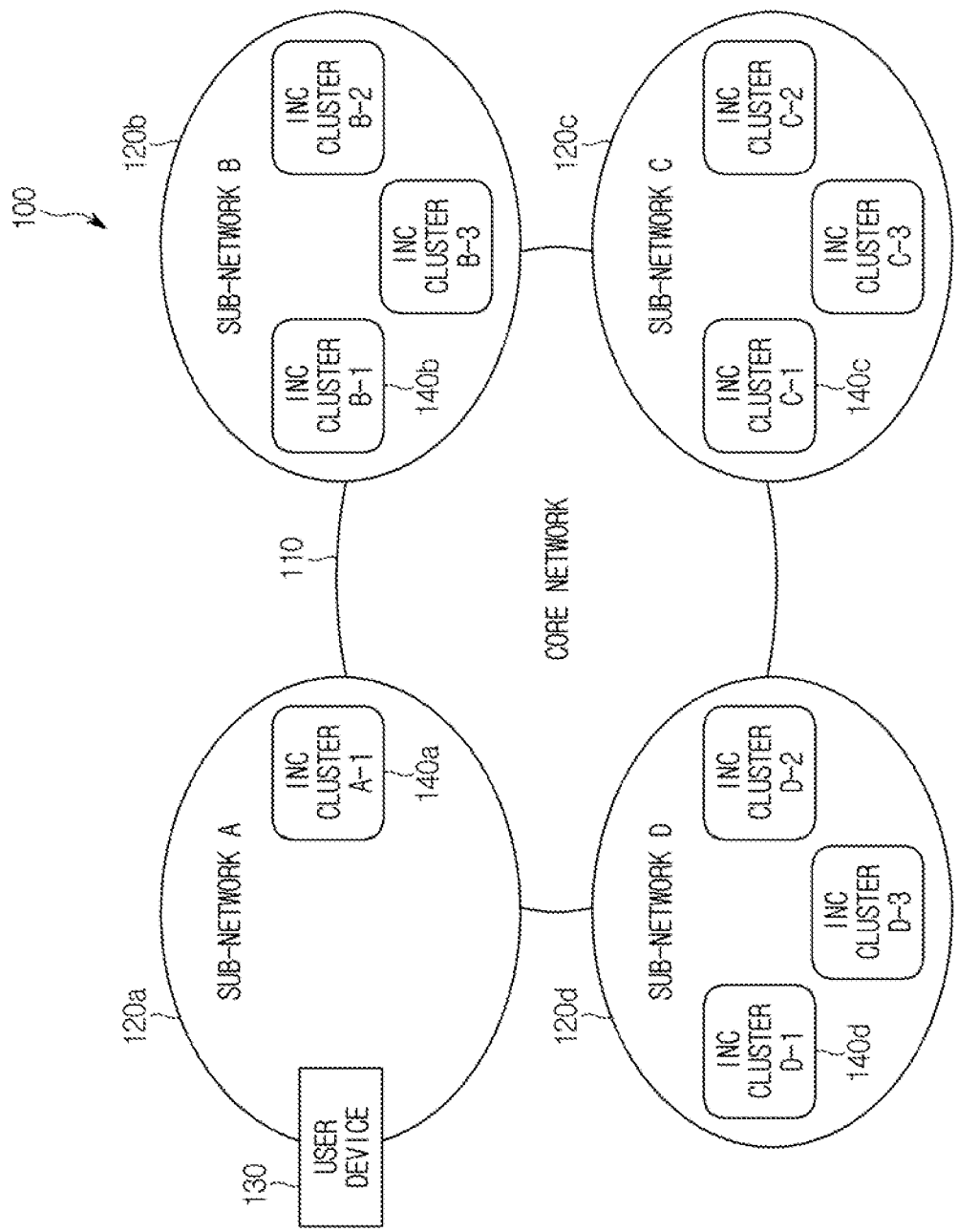
FIG. 1 is a view exemplifying network for explaining the present disclosure.

Hereinafter, exemplary embodiments of the present disclosure will be described in detail with reference to the accompanying drawings so that those skilled in the art may easily implement the present disclosure. However, the present disclosure may be implemented in various different ways, and is not limited to the embodiments described therein.

In describing exemplary embodiments of the present disclosure, well-known functions or constructions will not be described in detail since they may unnecessarily obscure the understanding of the present disclosure. The same constituent elements in the drawings are denoted by the same reference numerals, and a repeated description of the same elements will be omitted.

In the present disclosure, when an element is simply referred to as being "connected to", "coupled to" or "linked to" another element, this may mean that an element is "directly connected to", "directly coupled to" or "directly linked to" another element or is connected to, coupled to or linked to another element with the other element intervening therebetween. In addition, when an element "includes" or "has" another element, this means that one element may further include another element without excluding another component unless specifically stated otherwise.

In the present disclosure, the terms first, second, etc. are only used to distinguish one element from another and do not limit the order or the degree of importance between the elements unless specifically mentioned. Accordingly, a first element in an embodiment could be termed a second element in another embodiment, and, similarly, a second element in an embodiment could be termed a first element in another embodiment, without departing from the scope of the present disclosure.

In the present disclosure, elements that are distinguished from each other are for clearly describing each feature, and do not necessarily mean that the elements are separated. That is, a plurality of elements may be integrated in one hardware or software unit, or one element may be distributed and formed in a plurality of hardware or software units. Therefore, even if not mentioned otherwise, such integrated or distributed embodiments are included in the scope of the present disclosure.

In the present disclosure, elements described in various embodiments do not necessarily mean essential elements, and some of them may be optional elements. Therefore, an embodiment composed of a subset of elements described in an embodiment is also included in the scope of the present disclosure. In addition, embodiments including other elements in addition to the elements described in the various embodiments are also included in the scope of the present disclosure.

The advantages and features of the present invention and the way of attaining them will become apparent with reference to embodiments described below in detail in conjunction with the accompanying drawings. Embodiments, however, may be embodied in many different forms and should not be construed as being limited to example embodiments set forth herein. Rather, these embodiments are provided so that this disclosure will be complete and will fully convey the scope of the invention to those skilled in the art.

In the present disclosure, each of phrases such as "A or B", "at least one of A and B", "at least one of A or B", "A, B or C", "at least one of A, B and C", ""at Each of the phrases such as "at least one of A, B or C" and "at least one of A, B, C or combination thereof" may include any one or all possible combinations of the items listed together in the corresponding one of the phrases.

Hereinafter, embodiments of the present disclosure will be described with reference to the accompanying drawings.

FIG. 1 is a view exemplifying network for explaining the present disclosure.

A data protection system 100 for data name-based information centric in-network computing may include a core network 110, sub-networks 120*a* to 120*d*, and a user device 130. The core network 110 may connect the sub-networks 120*a* to 120*d* with each other so that they can exchange a request and result data. The sub-networks 120*a* to 120*d* may include at least one INC cluster 140*a* to 140*d*, and the INC cluster 140*a* to 140*d* may have an ICN router 142. Like an NDN router or a CCN router, the ICN router 142 is a network device that performs name-based routing, and every network node, for example, the INC cluster 140*a* to 140*d* of the sub-networks 120*a* to 120*d* different from each other may be connected to the ICN router 142. In addition, the user device 130 may access the INC cluster 140*a* to 140*d* via the ICN router 142. The request may be a user request through the user device 130, and the user request may be a request for transmission of specific data, and for obtaining specific information, operation result data calculated according to relevant data and operation. The user request may be transmitted to the INC cluster 140*a* to 140*d* through information centric in-network computing based on names of data.

FIG. 1 illustrates a configuration consisting of 4 sub-networks around a core network, and the user device 130 is located in the sub-network A. Since a function code for performing INC and data necessary for an operation may become all data connected to a network, they are not shown in the drawing. Hereinafter, for convenience of explanation, an embodiment according to the present disclosure is described to be the network illustrated in FIG. 1, but the network form is not limited thereto and various forms of implementation are possible.

Figure 2:
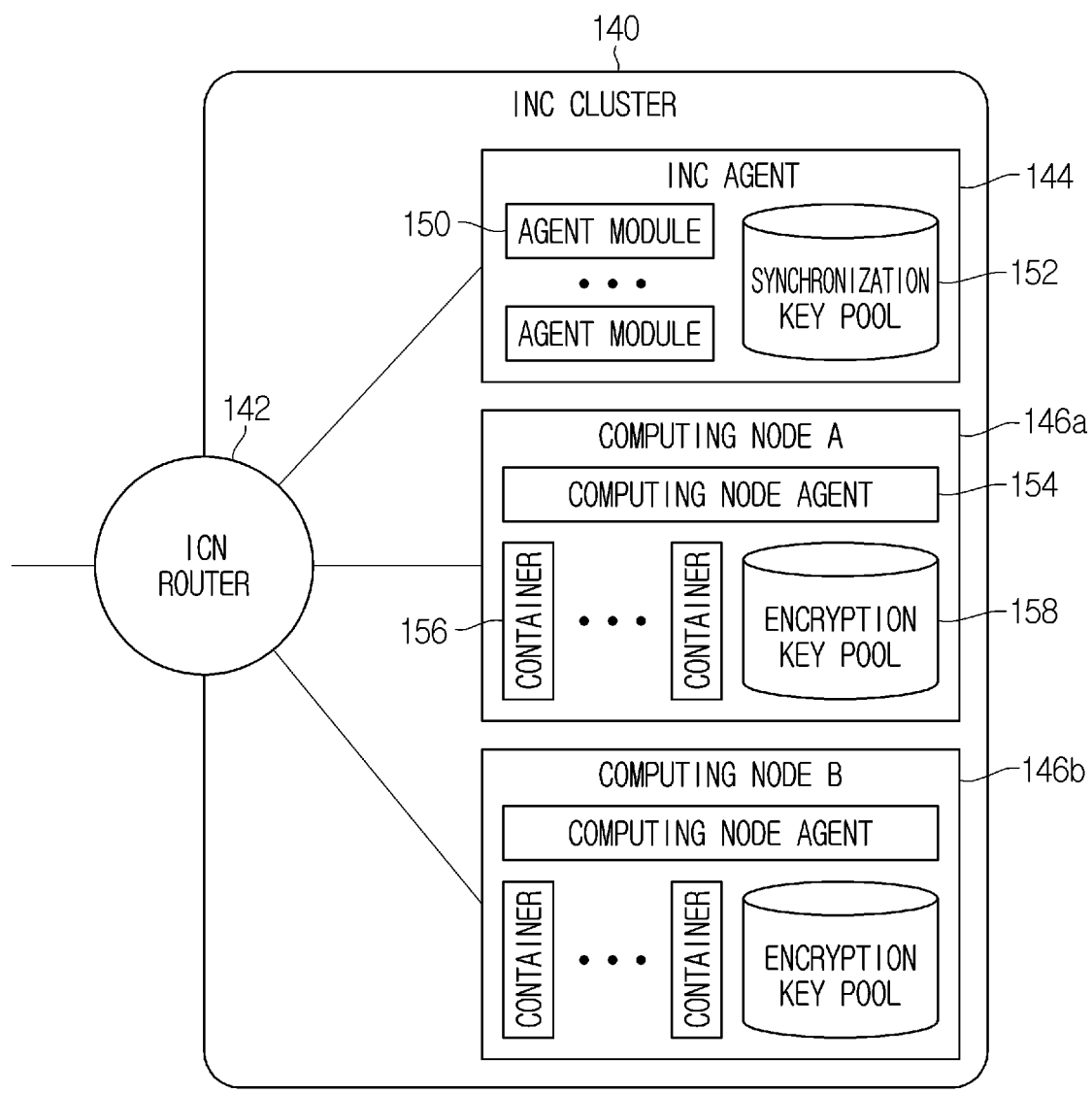
FIG. 2 is a view showing a structure of an INC network according to the present disclosure.

FIG. 2 is a view showing a structure of an INC network according to the present disclosure.

A unit structure of the sub-networks 120*a* to 120*d* is referred to as an INC cluster 140, and a set of at least one INC cluster 140 may form one sub-network 120*a* to 120*d*.

The INC cluster 140 may consist of the ICN router 142, the INC agent 144, and one or more computing nodes 146*a* and 146*b*. The ICN router 142 may connect not only the INC agent 144 and the computing nodes 146*a* and 146*b* but also a producer and a consumer of data and all the elements connected to an ICN network.

The INC agent 144 may function as a manager for providing an INC service, process a user request for the INC service, and perform overall management of the computing nodes 146*a* and 146*b*. The INC agent 144 may include an agent module 150 and a synchronization key pool 152. The agent module 150 may select the computing nodes 146*a* and 146*b* capable of processing a received user request and transmit the user request to a computing node agent 154 of the corresponding computing nodes 146*a* and 146*b*. The synchronization key pool 152 may be prepared beforehand in order to contain a security key for sharing a symmetric key used for encryption of result data at a user request and matching information indicating the computing nodes 146*a* and 146b to which the security key is allocated. The security key may include a public key which is a key sharing a symmetric key, and the result data may be output as an operation processing result based on a requested data-related command in a user request and may be used interchangeably with an operation result in the present disclosure.

The computing nodes 146a and 146b may generate a processor 156 (hereinafter referred to container) according to control of the INC agent 144 based on a container technology and may perform an operation by receiving a function code, which will process the operation at a user request, and necessary data. The computing nodes 146a and 146b may be configured to remove a container and thus to reuse a computing resource when performing an operation normally at a user request and returning result data (or operation result) to a user device. Specifically, the computing nodes 146a and 146b may include the computing node agent 154 and an encryption key pool 158. The computing node agent 154 may create the container 156 according to a creation command of the INC agent 144. In addition, the INC agent 144 may check the synchronization key pool 152 to determine a public key, which is to be used when creating the container 156 that will process a user request, and may allocate a public key prepared in the encryption key pool 158 to the container 156. Herein, the encryption key pool 158 may include a public key, a secret key pairing up with the public key, and matching information corresponding to the keys. The matching information may be associated with matching information of the synchronization key pool 152. In case a container creation command of the INC agent 144 has no information on an encryption key pool, the computing node agent 146a may create the container 156 according to a creation command received from the INC agent 144, and the container 156 may perform an operation according to a user request.

Figure 3:
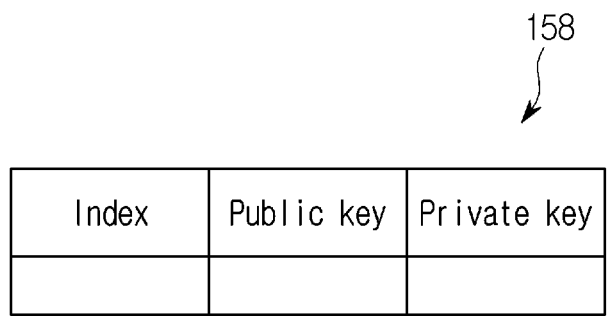
FIG. 3 is a view exemplifying an encryption key pool.

The computing nodes 146a and 146b, which are exemplified in FIG. 2, may each maintain the encryption key pool 158. FIG. 3 is a view exemplifying an encryption key pool. As illustrated in FIG. 3, the encryption key pool 158 may be configured as a table which is constructed by an index indicating the computing nodes 146a and 146b, a public key and a private key. When the computing nodes 146a and 146b are configured in the INC cluster 140a to 140d, the computing nodes 146a and 146b may create a predetermined number of entries of the encryption key pool 158 and maintain the number of entries. When one pair of keys is allocated to the container 156, a corresponding entry may be removed from the encryption key pool 158 and a new key pair may be created.

Figure 4:
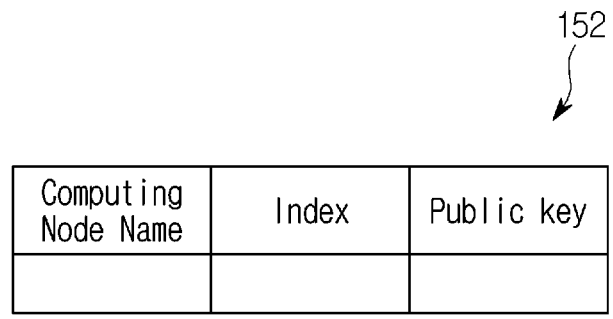
FIG. 4 is a view exemplifying a synchronization key pool.

FIG. 4 is a view exemplifying a synchronization key pool. The synchronization key pool 152 maintained by the INC agent may be a synchronization table composed of a name of the computing nodes 146a and 146b, an index indicating the computing nodes 146a and 146b, and a public key. After the encryption key pool 158 is created, the synchronization key pool 152 may maintain the index and the public key so that they can be equally shared in the encryption key pool 158. Since the synchronization key pool 152 should synchronize the encryption key pool 158 of a plurality of computing nodes 146a and 146b, it may store and include a name of the computing nodes 146a and 146b that maintain a corresponding public key. As the synchronization key pool 152 and an encryption key pool may be synchronized by various methods, the present specification provides no further details and is not limited the above methods.

In the environment illustrated in FIG. 1 and FIG. 2, an operation of a data protection system according to the present disclosure will be described.

For convenience, it is assumed that a function code and data are positioned at the sub-network C 120c. The user device 130 may specify and transmit a function code and data, which are necessary for an operation, to a network as a user request for an INC service. At this time, the user device 130 may specify and request an INC performance policy. According to the INC performance policy thus requested, each INC agent 144 may determine whether or not to process the received user request, by considering resource information of the computing nodes 146a and 146b in the INC agent 144 together with the data and a function for operation and the performance policy information, which are included in the user request.

In the case of an application which minimizes latency by performing an operation in a location close to the user device 130 according to the INC performance policy, the INC cluster A-1 140a may perform the operation. As another example, in the case of an application which minimizes a bandwidth by performing an operation in a location close to data according to a requested INC performance policy, an INC cluster of a sub-network, to which the data belongs, may perform the operation.

When an INC policy includes processing a user request at a sub-network in which data and a function code are positioned and the INC agent 144 of the INC cluster A-1 140a receives the user request, the INC agent 144 may forward the user request to the INC agent 140 of the sub-network C 120c. When the ICN router 142 of the sub-network C 120c receives a user request, the ICN router 142 may deliver the user request to one INC cluster 140c. When the INC agent 144 of the INC cluster C-1 140c receives a user request, the INC agent may create the container 156 at the computing node A 146a of the INC cluster C-1 140c by considering a computing resource state of a computing node and may return a name of the container 156 so that the user device 130 can access the container 156. At the same time, the container 156 may receive a function code and data, which are needed for an operation, and start the operation. Since the user device 130 receives a name of the container 156 as a response to a user request of an INC service, it may request an operation result directly to the container 156. When the INC operation is completed, the container 156 may return the operation result to the user device 130 and the container 156 may be removed.

In this embodiment, an operation result generated in the container 156 is delivered via a network as a response to a user request for an INC operation result, it may be exposed to various network attacks. An embodiment according to the present disclosure may provide a method of safely delivering an operation result by supporting encryption for data transmitted and received between the user device 130 and the container 156 performing an INC service and a system structure.

In order to support encryption according to an embodiment of the present disclosure, the INC agent 144 and the computing nodes 146a and 146b may have the synchronization key pool 152 and the encryption key pool 158 respectively, as described above, and be synchronized with each other, thereby maintaining a certain number of entries. This is to minimize latency, which is needed for an asymmetric encryption algorithm to create a key pair, and to prevent a private key from being delivered out of the computing nodes.

Hereinafter, the above-described operation process will be described in further detail with reference to FIGS. 5 to 8. FIGS. 5 to 8 show operation procedures of each component in FIG. 1 and FIG. 2 when a user request is executed according to an INC service. Specifically, FIGS. 5 to 8 show operation procedures of the user device 130, the INC agent 144, the computing nodes 146a and 146b, and the container 156. Hereinafter, an operation procedure of an embodiment according to the present disclosure will be described starting with a user request of the user device 130 for performing INC and along the flow of a message, when an INC service is provided in the system 100.

Figure 5:
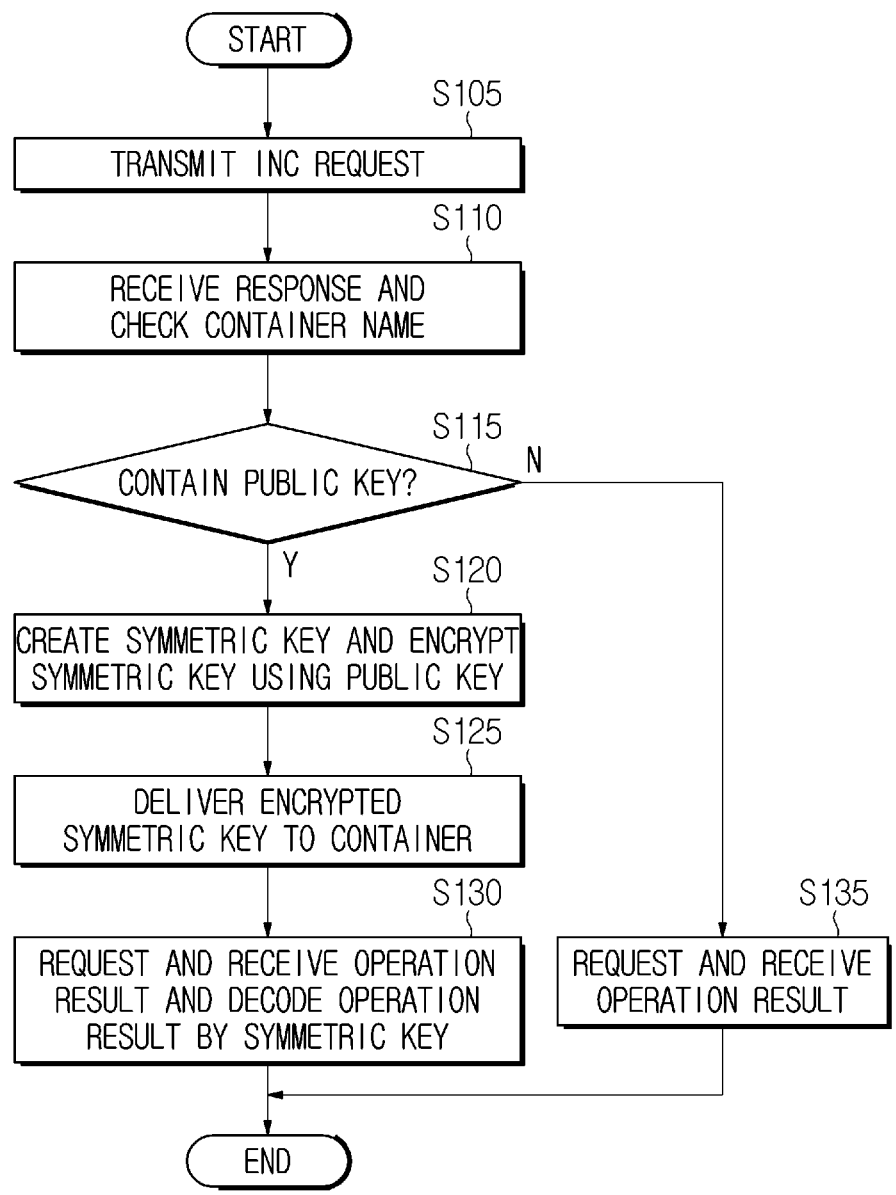
FIG. 5 is a flowchart showing a procedure in which a user device performs an INC request, according to an embodiment of the present disclosure.

FIG. 5 is a flowchart showing a procedure in which a user device performs an INC request, according to an embodiment of the present disclosure.

Like the above description of operation, the description below will be provided under the assumption that an operation at a user request is processed by the INC cluster C-1 140c that belongs to the sub-network C 120c.

First, the user device 130 may make a user request for an INC service to a network (S105).

Each of the INC agents 140a to 140d may determine whether or not to process the user request, by considering resource information of the computing nodes 146a and 146b in the INC agent 144 together with data and a function for operation and performance policy information, which are included in the user request. As another example, when an INC performance policy is included in the user request, the user request may be transmitted to a corresponding INC cluster 140c directly or via another INC cluster 140a-140d according to the policy. As described above, a corresponding INC cluster is exemplified as the INC cluster C-1 140c.

Next, the user device 130 receives a response from the INC cluster 140c, which will process an operation according to the request, and check a name of the container 156 included in the response (S110).

Figure 6:
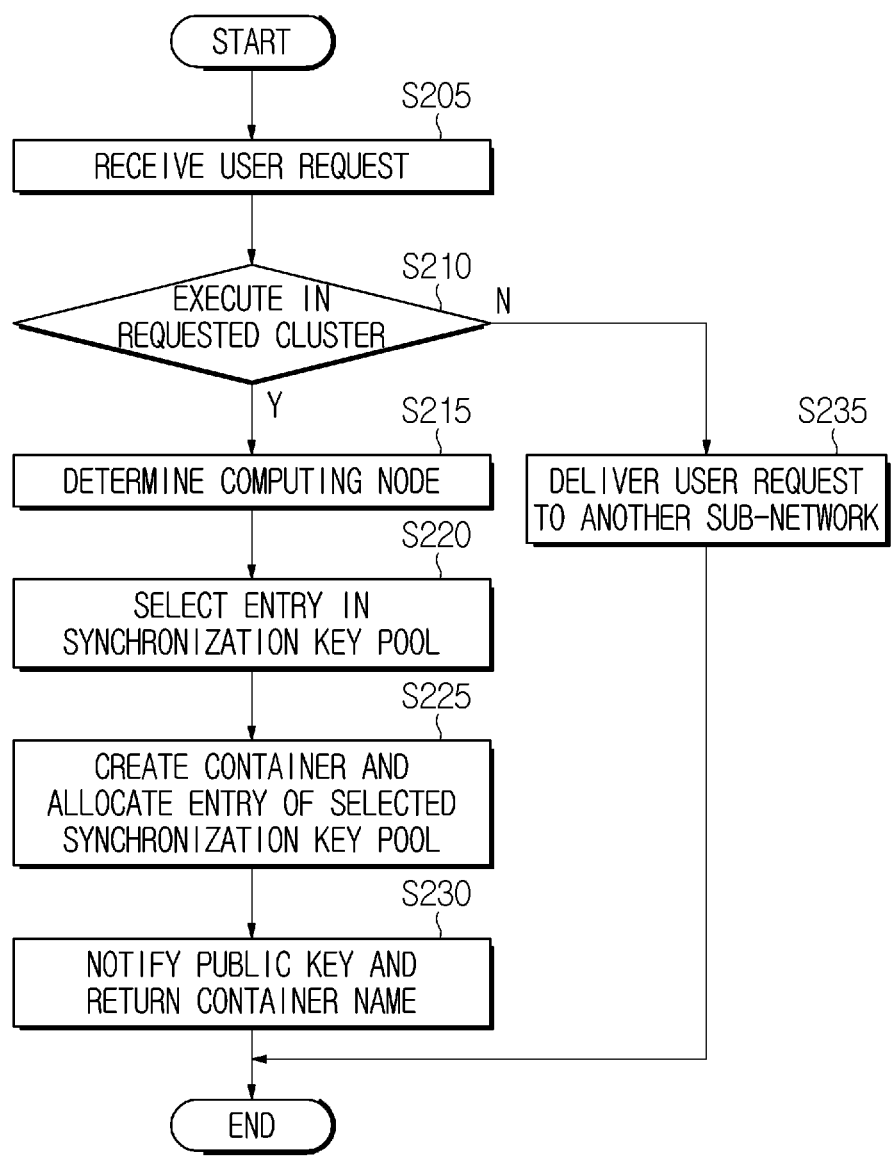
FIG. 6 is a flowchart showing an operation process when an INC agent receives an INC request from a user, according to another embodiment of the present disclosure.

In FIG. 6 described below, the INC cluster 140c, which will process the user request, may determine a computing node 146a that will perform the operation, and the computing node 146a may create the container 156 that will perform the operation. Accordingly, the INC cluster 140c may transmit a response message, which includes the name of the created container 156, to the user device 130. In addition, when the INC agent 144 searches a synchronization key pool and the encryption key pool 158 and confirms that there is a public key allocated to the computing node 146a, the computing node 146a may allocate a public key to the container 156 and a response message may be generated to notify the public key. In case there is no public key, the response message may be generated to include the name of the container 156 without a public key.

After confirming the name of the container 156, the user device 130 becomes capable of accessing the container 156 and thus a data exchange may be implemented between the user device 130 and the container 156.

Next, when confirming that the response message includes a public key (Y of S115), the user device 130 may create a symmetric key used for encrypting an operation result according to the user request and may encrypt the symmetric key by using the public key (S120).

Next, the user device 130 may deliver the encrypted symmetric key to the container 156 (S125).

Next, the user device 130 may request and receive an operation result from the container 156 and receive the operation result by decoding it to a symmetric key (S130).

Figure 7:
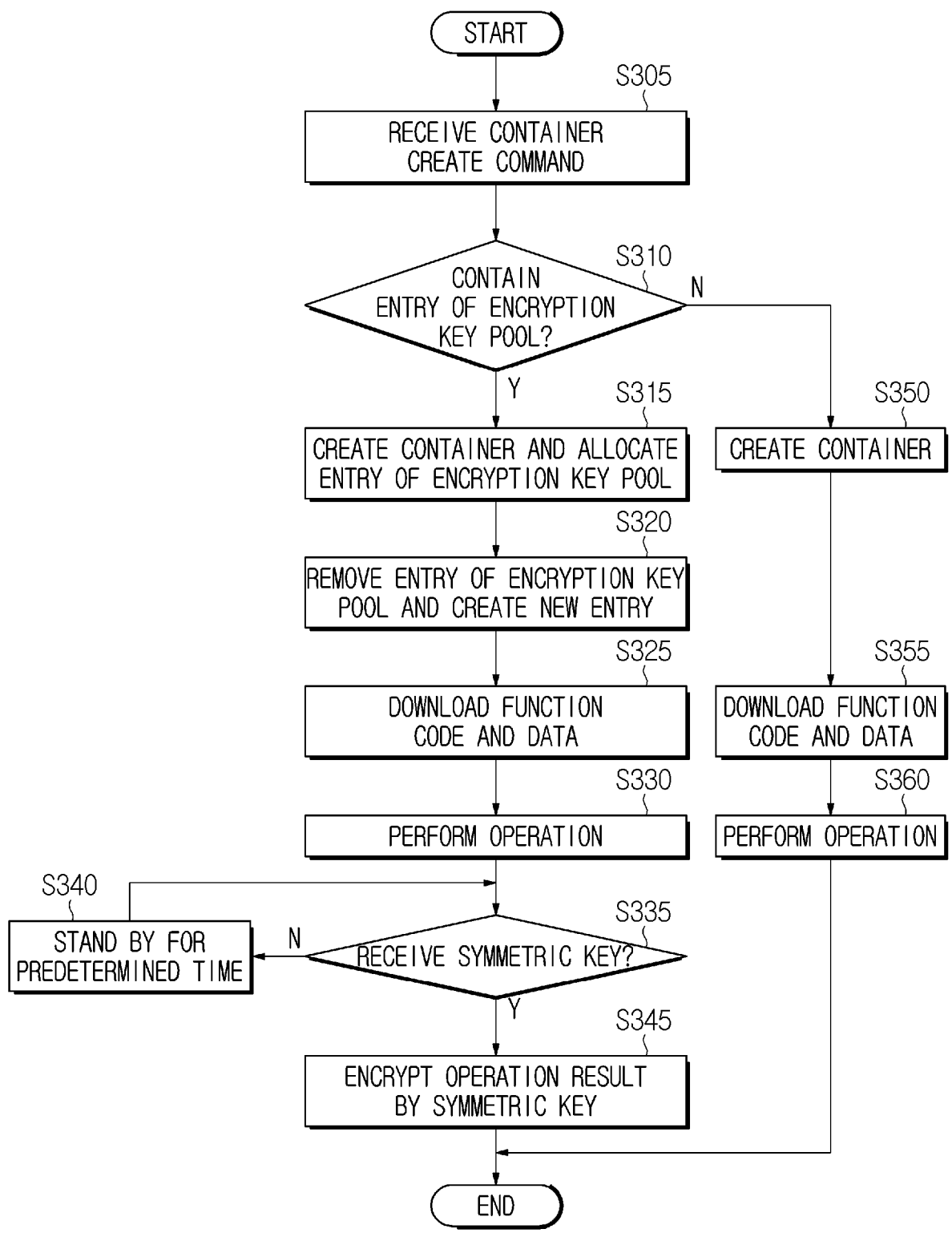
FIG. 7 is a flowchart showing a processing procedure when a computing node receives a container creation command from an INC agent, according to yet another embodiment of the present disclosure.

In FIG. 7 described below, the container 156 may perform an operation according to a user request and output an operation result, and when receiving a symmetric key from the user device 130, the container 156 may encrypt the operation result by using a symmetric key which is decoded by a private key. As the INC agent 140c may transmit the encrypted operation result to the user device 130, the user device 130 may receive the operation result.

Meanwhile, when confirming that the response message does not include a public key (N of S115), the user device 130 may request and receive an operation result from the container 156 (S135). Specifically, when the response message does not include a public key, since a corresponding INC service does not support encryption of an operation result, the user device 130 may transmit an operation result request message after receiving the response message.

FIG. 6 is a flowchart showing an operation process when an INC agent receives an INC request from a user, according to another embodiment of the present disclosure.

First, the INC cluster 140c may receive a user request (S205) and determine whether or not it is possible to process an operation in its cluster according to the user request (S210).

The user request, that is, an INC request of a user is delivered to the INC agent 144, and the INC agent 144 may determine whether or not processing is possible in the computing nodes 146a and 146b that belong to its cluster, by considering an INC performance policy, an attribute of an execution function, topology, and a computing resource state of the computing nodes 146a and 146b.

Next, when the INC agent 144 determines that it is possible to process an operation in its cluster (Y of S210), the INC agent 144 may determine the computing node 146a that best fits for the user request (S215).

Next, the INC agent 144 may check the synchronization key pool 152 and select an entry that belongs to the computing node 146a (S220).

Next, the INC agent 144 may deliver a creation command of the container 156 to the determined computing node 146a (S225). Herein, the INC agent 144 delivers an index (illustrated in FIG. 4) in the selected entry of the synchronization key pool 152 together with the creation command of the container 156 and thus allocate the entry of the synchronization key pool 152 to the container 156. Accordingly, a public key, which is prepared beforehand in the synchronization key pool 152 and the encryption key pool 158, is allocated to the container 156 that will process an operation, and a private key, which is prepared beforehand to form a key pair with a public key in the encryption key pool 158, may be used later to decode a received symmetric key.

Next, the INC agent 140 may deliver a response message notifying a name of the container 156 and a public key to the user device 130 (S230).

Specifically, the INC agent 144 may deliver a container creation command to the computing node 146a and then return the name of the container 156 to the user device 130 as a response to a user INC request so that the user device 130 can access directly to the container 156 without intervention of the INC agent 144. When the user device 130 creates and delivers a symmetric key to the container 156, a public key may be used to encrypt the symmetric key.

As another example, when the container 156 for performing an operation is not present in an entry of the synchronization key pool 152 and thus a public key is not allocated to the container 156, the INC cluster 140c may transmit a response message with the name of the container 156 without public key.

When the INC agent 144 determines that the operation is to be processed in another INC cluster (N of S210), the INC agent 144 may deliver the user INC request to a sub-network to which the other cluster belongs (S235).

FIG. 7 is a flowchart showing a processing procedure when a computing node receives a container creation command from an INC agent, according to yet another embodiment of the present disclosure.

The computing node 146a, which is determined by the INC agent 140c to perform an operation, may receive a creation command of the container 156 of the INC agent 144 (S305).

Next, when receiving the command, the computing node 146a may check whether or not the command includes an entry of the encryption key pool 158 (S310).

When the container creation command includes an encryption key pool entry (Y of S310), since it is a service that supports encryption, the computing node 146a may create a container according to the command of the INC agent 144 and allocate a public key-private key pair corresponding to an index (illustrated in FIG. 3) of the encryption key pool entry included in the command of the INC agent 144 to the container 156 (S315).

Meanwhile, the computing node 146a may remove an entry of the encryption key pool 158 allocated to the container, and in order to maintain a certain number of entries, the computing node 146a may create a new entry by creating a new public key-private key pair (S320). The new public key may be automatically synchronized with a synchronization key pool of the INC agent 144 by the above-described synchronizing operation. When the step S320 is implemented after the step S315, it does not matter whether the step S320 is implemented before or after the step S325.

Next, the created container 156 may download corresponding resources with a function code name delivered from the INC agent 144 and a name of data to be used for operation (S325) and then may perform an operation according to a user request (S330).

Next, the container 156 may keep checking whether or not a symmetric key is received from the user device 130 (S335) and may stand by to receive a symmetric key reception request and a result request until the symmetric key is received (S340).

When the operation is completed and the symmetric key is received from the user device 130, the container 156 may encrypt an operation result by using the symmetric key and transmit the encrypted operation result to the user device 130 (S345).

When the computing node 146a confirms that the command includes no entry of the encryption key pool 158, since a request according to a creation command of the container 156 is a service that does not support encryption, the container 156 may be created with no entry of the encryption key pool 158 being allocated (S350).

Next, the container 146a may download a necessary function and data (S335), perform an operation (S360) similarly to the step S325 and the step S330, and transmit an operation result without encryption to the user device 130 at an operation result request of the user device 130.

Figure 8:
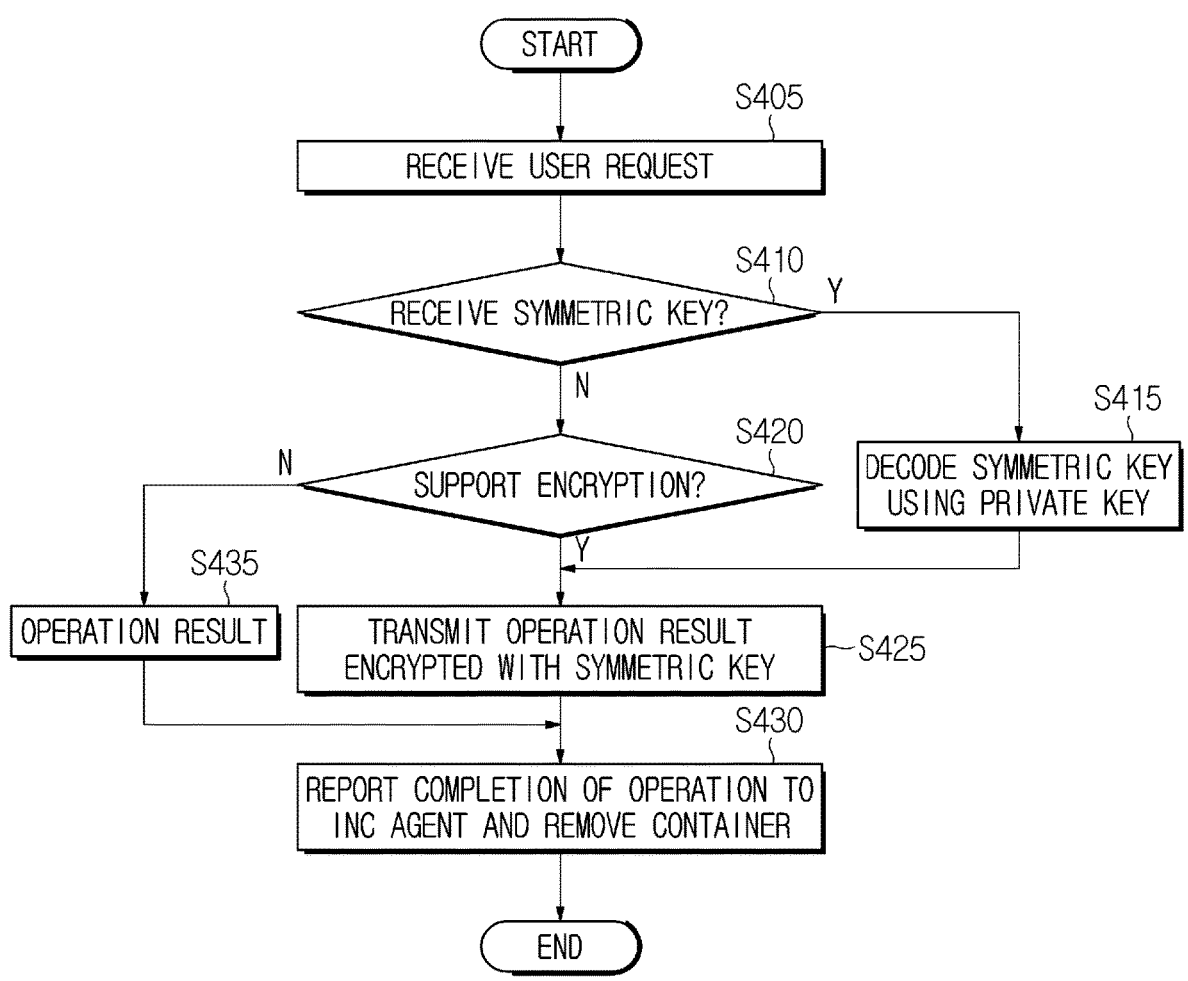
FIG. 8 is a flowchart showing a processing procedure when a processor receives a request from a user, according to yet another embodiment of the present disclosure.

FIG. 8 is a flowchart showing a processing procedure when a processor receives a request from a user, according to yet another embodiment of the present disclosure.

During the operation of FIG. 7, the container 156 may receive a user request related to an operation result command (S405).

At the user request related to the result demand, the container 156 may check whether or not a symmetric key encrypted with a public key is received (S410), and when it is confirmed that the symmetric key is included (Y of S410), the container 156 may decode the symmetric key by using a private key allocated to it (S415).

When the user request related to the result demand does not contain the symmetric key (N of S410), since the user request is an operation result request, it may be determined whether or not a corresponding service is a service that supports encryption (S420).

When the service supports encryption (Y of S420), the container 156 may stand by and receive the symmetric key and then return an operation result encrypted with the symmetric key to the user device 130 (S425). When the service does not support encryption (N of S420), the container 156 may return an operation result as it is, that is, without encryption, to the user device 130 (S425).

After the operation result is delivered to the user device 130, the INC agent 144 may receive an operation completion notice of the container and enable the computing node 146a to remove the container 156 and to return a computing resource (S430).

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some of the steps.

The various embodiments of the present disclosure are not a list of all possible combinations and are intended to describe representative aspects of the present disclosure, and the matters described in the various embodiments may be applied independently or in combination of two or more.

In addition, various embodiments of the present disclosure may be implemented in hardware, firmware, software, or a combination thereof. In the case of implementing the present invention by hardware, the present disclosure can be implemented with Application Specific Integrated Circuits (ASICs), Digital Signal Processors (DSPs), Digital Signal Processing Devices (DSPDs), Programmable Logic Devices (PLDs), Field Programmable Gate Arrays (FPGAs), general processors, controllers, microcontrollers, microprocessors, etc.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

What is claimed is:

1. A method for protecting data for data name-based information centric in-network computing, the method comprising:
   preparing, at a computing node, an encryption key pool that includes a security key for sharing a symmetric key used for encrypting result data according to a user's request and matching information;
   preparing, at an INC agent receiving the user's request, a synchronization key pool for sharing the security key through the matching information;
   creating, by the computing node, a processor for executing output processing of the result data and allocating a security key to the processor based on the matching information of the encryption key pool when a security key exists, the security key being allocated to the computing node which is determined to perform the request in the INC agent; and removing, by the INC agent and the computing node, the allocated security key and the matching information from the synchronization key pool and the encryption key pool when the security key is allocated to the processor and creating a new security key and new matching information.

2. The method of claim 1, wherein the security key includes a public key and the encryption key pool includes the public key, a secret key pairing up with the public key, and the matching information corresponding to the public key and the secret key.

3. The method of claim 1, wherein, after the creating of the processor and allocating of the security key, a device of the user accesses the processor, and data exchange is implemented between the device of the user and the processor.

4. The method of claim 1, further comprising:
transmitting, by the processor, a name of the processor and the security key to the device of the user;
creating, by the device, a symmetric key by using the security key and encrypting the symmetric key and transmitting the symmetric key to the processor;
outputting, in the processor, the result data, encrypting the result data by the symmetric key and transmitting the encrypted result data to the device; and
decoding, by the device, the encrypted result data by the symmetric key.

5. The method of claim 4, further comprising:
checking, in the processor, a security key allocated to the processor based on the matching information of the encryption key pool after the encrypting and transmitting of the symmetric key to the processor and decoding the encrypted symmetric key by the security key.

6. The method of claim 1, wherein the output processing of the result data is operation processing based on a requested data-related command in the user's request.

7. The method of claim 6, further comprising:
determining, by the INC agent, whether or not to process the received user's request, by considering resource information of the computing node managed by the INC agent together with data and a function for the operation processing, which are included in the requested data-related command, and performance policy information before the creating of the processor and allocating of the security key.

8. The method of claim 1, further comprising creating, by the computing node, a processor for executing the output processing of the result data, when there is no security key allocated to the computing node which is determined to perform the request.

9. The method of claim 8, further comprising:
outputting, in the processor, the result data and transmitting the result data to the device of the user; and
receiving, in the device, the result data.

10. A system for protecting data for data name-based information centric in-network computing, the system comprising:
a computing node configured to prepare an encryption key pool that includes a security key for sharing a symmetric key used for encrypting result data according to a user's request and matching information; and
an INC agent configured to receive the user's request and prepare a synchronization key pool for sharing the security key through the matching information,
wherein the computing node creates a processor for executing output processing of the result data and allocates a security key to the processor based on the matching information of the encryption key pool when the security key exists, the security key being allocated to the computing node which is determined to perform the request in the INC agent,
wherein the INC agent and the computing node are further configured to remove the allocated security key and the matching information from the synchronization key pool and the encryption key pool when the security key is allocated to the processor, and are configured to create a new security key and new matching information.

11. The system of claim 10, wherein:
the security key includes a public key, and
the encryption key pool includes the public key, a secret key pairing up with the public key, and the matching information corresponding to the public key and the secret key.

12. The system of claim 10, wherein a device of the user accesses the processor by creating the processor and allocating the security key and data exchange is implemented between the device of the user and the processor.

13. The system of claim 10, wherein:
the processor is further configured to transmit a name of the processor and the security key to the device of the user,
the device is further configured to create a symmetric key and to encrypt the symmetric key and transmit the symmetric key to the processor,
the processor is further configured to output the result data, to encrypt the result data by the symmetric key and to transmit the encrypt result data to the device, and
the device is configured to decode the encrypted result data by the symmetric key.

14. The system of claim 13, wherein, when the symmetric key is encrypted and transmitted to the processor, the processor is further configured to check a security key allocated to the processor, based on the matching information of the encryption key pool, and to decode the encrypted symmetric key by the security key.

15. The system of claim 10, wherein the output processing of the result data is operation processing based on a requested data-related command in the user's request.

16. The system of claim 15, wherein the INC agent is further configured to determine whether or not to process the received user's request, by considering resource information of the computing node managed by the INC agent together with data and a function for the operation processing, which are included in the requested data-related command, and performance policy information before creating the processor and allocating the security key.

17. The system of claim 10, wherein the computing node is further configured to create a processor for executing the output processing of the result data, when there is no security key allocated to the computing node which is determined to perform the request.

18. The system of claim 17, wherein the processor is further configured to output and transmit the result data to the device of the user, and wherein the device is further configured to receive the result data.

* * * * *